United States Patent [19]

Ball et al.

[11] Patent Number: 4,636,295

[45] Date of Patent: Jan. 13, 1987

[54] METHOD FOR THE RECOVERY OF LITHIUM FROM SOLUTIONS BY ELECTRODIALYSIS

[75] Inventors: Donald L. Ball, Castlegar; Daniel A. D. Boateng, Montrose, both of Canada

[73] Assignee: Cominco Ltd., Vancouver, Canada

[21] Appl. No.: 799,701

[22] Filed: Nov. 19, 1985

[51] Int. Cl.⁴ .......................... C25B 1/16; C25B 9/00; B01D 13/00

[52] U.S. Cl. ................................ 204/182.4; 204/182.5

[58] Field of Search ........................... 204/182.4, 182.5

[56] References Cited

U.S. PATENT DOCUMENTS

| | | | |
|---|---|---|---|
| 3,014,855 | 12/1961 | Kressman | 204/182.4 |
| 3,149,061 | 9/1964 | Parsi | 204/182.5 |
| 3,291,713 | 12/1966 | Parsl | 204/182.4 |
| 3,752,749 | 8/1973 | Chlanda et al. | 204/182.4 |
| 3,964,985 | 6/1976 | Giuffrida | 204/182.4 |
| 4,111,780 | 9/1978 | Murayama et al. | 204/182.5 |
| 4,141,825 | 2/1979 | Conger | 204/182.4 |

FOREIGN PATENT DOCUMENTS

| | | | |
|---|---|---|---|
| 392234 | 3/1964 | Japan | 204/182.4 |
| 1084196 | 9/1967 | United Kingdom | 204/182.5 |
| 539833 | 8/1974 | U.S.S.R. | 204/182.4 |
| 939399 | 6/1982 | U.S.S.R. | 204/182.4 |

OTHER PUBLICATIONS

Kaplan et al, Chemical Abstracts 60 (1963) #6507b.

*Primary Examiner*—Arthur P. Demers
*Attorney, Agent, or Firm*—Arne I. Fors; Robert F. Delbridge

[57] ABSTRACT

Lithium-containing brines containing mono and multivalent cations, especially magnesium, and anions are treated by electrodialysis to effect separation of a lithium concentrate low in multivalent cations from which lithium can be recovered as chloride, sulfate, or carbonate. Brine containing 0.03 to 15 g/L Li and a ratio of Mg:Li as high as 60:1 is subjected to one or more electrodialysis steps. The preferred cationic and anionic membranes are those that are strongly acidic and have sulphonic acid radical and trimethylamine derivatives, respectively, as active groups at 3 to 4 milligram equivalent per gram of dry resin and have a matrix of styrene divinyl benzene copolymer on a pvc base. Electrodialysis is carried out at a pH below 7 under turbulent conditions. The number of electrodialysis steps depends on the permselectivity of the membranes, the Mg:Li ratio in the feed and that in the concentrate, the latter being maintained at 5:1 or less. The chloride concentration in the electrode compartments is maintained at less than 3 g/L. In multi-step electrodialysis, a portion of the magnesium may be removed in an intermediate stage by the addition of lime, the lithium in the resulting solution being further concentrated by electrodialysis.

27 Claims, No Drawings

METHOD FOR THE RECOVERY OF LITHIUM FROM SOLUTIONS BY ELECTRODIALYSIS

BACKGROUND OF THE INVENTION

This invention relates to a method for the recovery of lithium from solutions and, more particularly, to a method for the recovery of lithium from lithium-containing brines and solutions using electrodialysis.

In the recovery of lithium from ores, ore may be baked with sulfuric acid, the product leached with water, resulting lithium sulfate solution treated with lime and soda ash to remove calcium and magnesium, and lithium precipitated as carbonate. Other ore-treating methods include the so-called alkaline methods and ion-exchange methods which yield solutions of lithium as hydroxide, chloride or sulfate. These methods also include the removal of calcium and magnesium by treatment with lime and soda ash.

In the recovery of lithium from natural, predominantly chloride, brines, which vary widely in composition, an economical recovery depends not only on the lithium content but also on the concentrations of interfering ions, especially calcium and magnesium. Magnesium is particularly troublesome because its chemical behaviour in solution is very similar to that of lithium. If the magnesium content is low, removal by precipitation with lime is feasible. Evaporation and treatment with lime and soda ash, is followed by precipitation of lithium carbonate. In the case of a high magnesium content, removal with lime is not feasible and various ion exchange and liquid-liquid extraction methods have been proposed. Thus, it is obvious that, although conventional processing of ores and brines makes it possible to eliminate major portions of interfering ions, the separation of lithium from magnesium remains a serious problem.

Lithium brines have also been subjected to electrolysis or to membrane electrolysis, but usually only after the calcium and magnesium contents have been reduced to relatively low values. Therefore, electrolysis and membrane electrolysis of lithium salt solutions, usually with the object of producing a lithium compound, not only require the additional step of removing calcium and magnesium, but have the additional disadvantage of the evolution of copious amounts of gases such as hydrogen and chlorine.

It is suggested that the use of electrodialysis alone or in combination with cation exchange may overcome these difficulties to some extent and can accomplish a separation of lithium from multivalent cations such as iron, aluminum, calcium and magnesium. More specifically, in U.S. Pat. No. 3,063,924, it is stated that the removal of univalent ions and multivalent anions from aqueous solutions is easily accomplished, but the presence of multivalent cations such as calcium and magnesium causes difficulties due to the formation of deposits on membranes. Hence, multivalent cations are first removed by means of a cation exchanger whereupon calcium and magnesium deposit after which the liquid is passed through an electrodialyzing apparatus to remove a portion of at least one monovalent ion and to form a concentrated salt solution. This method still requires the prior removal of calcium and magnesium in a separate operation. G. E. Kaplan et al have reported (Chemical Abstracts, volume 60, 6507*a*) that good separations of lithium ions from multivalent ions, such as ferric, aluminum, magnesium and calcium ions, can be obtained at high pH in a three-compartment electrodialysis cell using unipolar and bipolar ion-exchange membranes, a nickel anode and a lead-antimony alloy cathode. The presented data show that only relatively dilute solutions have been used. It is stated that at high pH hydroxides of the multivalent cations precipitate, and that at low pH the selectivity toward these cations is considerably lowered.

SUMMARY OF THE INVENTION

We have now found that lithium in solutions can be concentrated to a high concentration and that a very effective separation of lithium from brines comprising lithium and high concentrations of multivalent ions, especially magnesium, can be obtained with high selectivity by subjecting such solutions and brines to electrodialysis at low or neutral pH using monopolar cationic and anionic permselective membranes.

The cationic membranes that are useful are those that are permselective for monovalent cations, and the anionic membranes are chosen dependent on the form in which lithium is to be recovered from the concentrate and can be permselective for monovalent or mono and multivalent anions. By carefully controlling the operating conditions, such as current densities, acidities and flow rates, a concentrated solution of lithium with a low magnesium to lithium weight ratio can be recovered. Feed solutions containing as little as 30 mg lithium per liter of brine or solution and a magnesium to lithium weight ratio as high as sixty to one can be processed.

When treating chloride-containing lithium brines, the evolution of chlorine can be suppressed by the choice of an appropriate rinse solution.

A high recovery of lithium and a satisfactory rejection of multivalent cations, especially magnesium, can be achieved by carrying out the method in a single stage. With feed brines with high ratios of magnesium to lithium, it may be necessary to carry out the method in more than one stage. In one embodiment, the lithium content in the concentrate is raised partially in a first stage while lowering the magnesium content. Subsequently, a major portion of the magnesium in the concentrate is removed with lime. The remaining solution is subjected to a second stage electrodialysis to concentrate the lithium content further.

Accordingly, there is provided a method for the recovery of lithium from brines containing monovalent cations including lithium, multivalent cations including magnesium and monovalent and multivalent anions which method comprises the steps of subjecting brine to electrodialysis; feeding brine to diluate cells of an electrodialysis unit comprising a multiplicity of alternating monopolar cationic permselective membranes and monopolar anionic permselective membranes, said membranes defining alternating diluate and concentrate cells, an anode compartment and a cathode compartment, an anode positioned in the anode compartment and a cathode positioned in the cathode compartment; applying an electrical current between the anode and the cathode at a value such that the value of the corresponding current density is in the range of about 10 to 500 $A/m^2$; maintaining the temperature in the electrodialysis in the range of about 0° to 60° C.; maintaining the pH of the brine fed to the unit at a value of less than about 7; passing flows of solutions through the diluate and concentrate cells at a linear velocity sufficient to maintain turbulent flow in said cells; removing a lithium-depleted diluate from the diluate cells; withdrawing a lithium-enriched concentrate from the concentrate cells, said concentrate containing magnesium and lithium in a weight ratio of about 5:1 or less; and recovering lithium from withdrawn concentrate.

DESCRIPTION OF THE PREFERRED EMBODIMENT

Brines that can be treated according to the method of the invention are natural brines such as occurring at Searle's Lake, the Great Salt Lake and Clayton Valley in the United States and at various locations in Argentina, Bolivia and Chile. Other brines that can be treated are oilfield brines, geothermal brines and intermediate solutions and brines obtained in the processing of ores and natural brines. Such brines contain varying amounts of monovalent cations including lithium, multivalent cations including calcium, magnesium, iron, copper and zinc and anions including sulfate, borate and chloride.

Although the method of the invention is suitable for the recovery of lithium from above-mentioned solutions and brines, the method is especially useful in the treatment of brines which contain high ratios of magnesium to lithium as well as from those that contain very low concentrations of lithium. Such lithium-high magnesium brines are usually first treated by evaporation in conventional evaporators or in solar ponds, whereby substantial amounts of salts other than the lithium and magnesium salts have been precipitated and removed from the brine. Low-lithium brines, such as oilfield or geothermal brines, can also be treated advantageously by the method of the present invention.

Thus, the lithium brines suitable as feed for the treatment by the method of the present invention are brines containing lithium in a concentration as low as 30 mg/L. A practical upper limit for the lithium concentration in a feed brine is about 15 g/L, which is the practically attainable concentration for most brines in solar evaporation. Typically, feed brines contain about 0.5 to 7 g/L lithium. Brines containing high concentrations of monovalent cations other than lithium may be first, at least partially, evaporated to reduce the concentrations of the monovalent cations other than lithium. During such partial evaporation, major portions of sodium and potassium salts precipitate and can be removed.

The lithium brine, whether or not partially evaporated, is fed to an electrodialysis unit. The electrodialysis unit or electrodialyzer comprises a multiplicity of vertically arranged, alternating anion permselective exchange membranes and univalent cation permselective exchange membranes, a cathode compartment and an anode compartment. The choice of membranes is very important. Suitable cationic membranes must have a high permselectivity (to be defined) for lithium, a low permselectivity for multivalent cations, especially magnesium, a high resistance against chemical deterioration, biological fouling and thermal degradation, a low electrical resistance and a high mechanical strength. We have found that suitable cationic permselective membranes are, for example, strongly acidic membranes which have a membrane matrix of a styrene di-vinyl benzene co-polymer on a polyvinyl chloride base and possess sulphonic acid radicals ($R—SO_3H$) as active groups. The active groups comprise 3–4 milli-equivalents per gram of dry resin which is satisfactory to provide the desired selectivity for univalent ions. In particular, we have found that suitable cationic permselective membranes are treated Selemion TM CMR, Selemion TM Experimental A (specially treated on one face) and Selemion TM Experimental B (both surfaces specially treated). Suitable anionic permselective membranes must have properties similar to those for the cationic membranes. Suitable anionic permselective membranes are, for example, strongly basic membranes with active groups derived from trimethylamine (for example, $R—N(CH_2)_3.Cl$) at 3–4 milli-equivalents per gram of dry resin, and having a matrix of a styrene di-vinyl benzene co-polymer on a polyvinyl chloride base. In particular, Selemion TM ASV, which is permselective for univalent anions, or Selemion TM AMV which is non-selective for univalent anions (i.e. permeable to mono and multivalent anions) are suitable, the choice being dependent on the particular embodiment of the method (to be described). A combination of the preferred membranes will, therefore, make it possible to concentrate the monovalent cations, such as Li, Na and K, and monovalent anions such as Cl or mono and multivalent anions such as Cl, $SO_4$, and borates. The Selemion TM membranes, which are manufactured by the Asahi Glass Company of Tokyo, Japan, have the desired properties. It is understood that membranes with similar properties produced by other manufactures such as Neosepta TM CM-1 and Neosepta TM CMS membranes that have sulphonic acid active groups and are produced by the Tokuyama Soda Co. Ltd. of Japan, are similarly suitable and that the use of combinations of other membranes may yield the desired results.

The alternating cationic and anionic membranes form alternating diluate cells and concentrate cells situated between the anode compartment and the cathode compartment. The anode and cathode are made of suitable materials. For example, the anode can be made of platinum coated titanium and the cathode of stainless steel. A source of direct current is connected to the electrodes. The lithium brine is fed to the diluate cells, preferably after removal of suspended solids. A lithium-depleted diluate is withdrawn from the diluate cells. It is important to maintain turbulent conditions in the concentrate and diluate cells. This can be achieved by passing solution through the cells at a sufficient rate. At least a portion of the diluate may be recycled and fed into the diluate cells mainly to ensure turbulent conditions. A lithium-enriched concentrate is withdrawn from the concentrate cells as product. If desired, at least a portion of the withdrawn concentrate may be circulated as feed to the concentrate cells to ensure turbulent conditions. Instead of concentrate, a quantity of a dilute receiving solution of an acidic substance may be fed to the concentrate cells, mainly for reason of pH control. If desired, a quantity of acidic substance solution may be fed to the concentrate cells alone or together with and in addition to a circulated portion of the lithium concentrate. Whether the feeding of a solution of an acidic substance is necessary depends on the net water transfer in the electrodialyzer.

During electrodialysis, water is transferred by osmosis from the diluate to the concentrate sides of the membranes and by electroosmosis, which takes place in the direction of the transferring ions. Feed brines with a high salt concentration (e.g. molar concentration of about 20) have a high osmotic pressure and thus a high rate of osmotic transfer can be expected. For such feeds, the water transfer caused by osmosis is in the opposite direction to that caused by electro-osmosis and, thus, tends to reduce the net water transfer. For dilute feed brines, both osmosis and electroosmosis are in the same direction to augment the net water transfer which can be as high as 20 g mol/h or higher.

With relatively concentrated feed brines it may be necessary to feed a receiving solution of an acidic substance to the concentrate cells, while for relatively dilute brines the feeding of an acidic receiving solution to the concentrate cells may be unnecessary. Generally, the feeding of an acidic receiving solution is necessary when the net-water transfer rate to the concentrate cells is less than the withdrawal rate of concentrate from the concentrate cells.

The nature of the acidic substance in the receiving solution depends on the form in which the lithium is to be recovered from the concentrate. If recovery as lithium chloride is desired, the acidic substance is a hydrochloric acid. If recovery as lithium carbonate is desired, the acidic substance can be dilute sulfuric acid, or a solution of sodium sulfate or bisulfate, the use of sulfuric acid being preferred.

The cathode and anode compartments are rinsed with a circulating rinse solution. It was discovered that the anodic reaction yields mostly oxygen when the chloride ion concentration in the circulating anode rinse solution is kept at less than about 3 g/L. The rinse solution is preferably acidified to increase the electrical conductivity. The rinse solution can be water or a salt solution acidified to a pH of about 2. A pH of about 2 also prevents the formation of basic precipitates. The use of sodium sulfate solution with a concentration in the range of 0.1 to 1.0 molar, preferably 0.2 to 0.5 molar sodium sulfate, acidified with sulfuric acid to a pH of about 2, is preferred. This rinse solution also causes evolution of oxygen, thereby minimizing the evolution of chlorine, which, unless recovered, constitutes an undesirable byproduct. The same rinse solution is circulated to both the anode compartment and the cathode compartment.

When using monovalent cation permselective and anion permselective membranes, the monovalent cations and anions in the feed solution pass from the diluate cells to the concentrate cells through the cationic and anionic membranes respectively, leaving multivalent cations and anions in the diluate cells. The use of monovalent permselective cationic and anionic membranes is desired when lithium is to be recovered from concentrate as lithium chloride. When lithium is to be recovered as lithium sulfate, the use of monovalent cation permselective membranes and multivalent anion permselective membranes is preferred. The gases evolved at the electrodes are carried from the cathode and anode compartments in the rinse solution. Unlike membrane electrolysis, the volume of gases evolved in electrodialysis is small, especially also in relation to the volume of brine treated.

The permselectivity $P_{M1/M2}$ of a membrane is defined as the ratio between the specific transport rate of a first element $M_1$ and that of a second element $M_2$ through the membrane; the specific transport rate being the quotient of the transfer rate of the element over the concentration of that element. In the present method, to effect separation of lithium from magnesium into a lithium-enriched concentrate, $P_{Li/Mg}$ should be greater than one, and preferably much greater than one. Desirable values of $P_{Li/Mg}$ are related to the weight ratio of Mg:Li and the number of electro dialysis steps.

For brines containing both lithium and multivalent cations, especially magnesium, the conventional processing of such brines by lime addition to precipitate magnesium limits the Mg:Li weight ratio to about 7:1. The ratio is preferably limited to 5:1. Ratio of higher than about 7:1 can cause formation of unmanageable precipitates. The Mg:Li weight ratio in concentrates obtained as final product by electrodialysis and to be subjected to further treatment should, therefore, also be restricted to an upper value of about 5:1 or less to avoid difficulties in subsequent processing. However, by establishing the number of electrodialysis steps in relation to the $P_{Li/Mg}$ value, feed brines with much higher Mg:Li ratios can be processed. For example, a brine containing magnesium and lithium in a weight ratio of 20:1 can be treated by electrodialysis using membranes having values for $P_{Li/Mg}$ of $>4$, 1.5, or 1.1 in 1, 4 and 15 steps of electrodialysis preferably arranged in series, respectively, to give a final concentrate product with a Mg:Li weight ratio of about 5:1 or less. In multi-step electrodialysis to improve the Mg:Li ratio, the concentrate from one step is used as feed in a subsequent step, the last electrodialysis giving a final concentrate having the preferred Mg:Li ratio of not greater than about 5:1.

As stated above, the lithium feed brine may contain as little as 30 mg/L lithium and as much as 15 g/L lithium, typically 0.5 to 7 g/L. With lithium-high magnesium feed brines, the magnesium to lithium weight ratio in the feed is in the range of about 1:1 to 60:1. The ratio is usually higher than about 1:1 but should preferably not exceed about 60:1, to give the preferred ratio in the final concentrate of about 5:1 or less. The lithium in the concentrate can be concentrated up to a value just below its solubility, but the precipitation of lithium or any other salt should, of course, be avoided. The recovery of lithium can be increased by subjecting the diluate from the electrodialysis to one or more additional electrodialysis steps. Thus, lithium recovery can be maximized by subjecting brine to multiple-step electrodialysis, feeding diluate from one step as feed to the next electrodialysis step. If desired, an amount of magnesium can be removed in an intermediate precipitation, wherein solution is treated with lime. Suitable concentrations of lithium in the final concentrate can be as high as about 40 g/L, at, as stated, a magnesium to lithium weight ratio of about 5:1 or less. Lithium is recovered from the concentrate as its chloride, carbonate or sulfate according to known methods.

The electrodialyzer may be operated with brine temperatures in the range of from just above the freezing temperature to as high as 60° C. At the higher temperatures, the process is more efficient but the life of the membranes is reduced. The process is preferably operated with brine temperatures in the range of about 5 to 50° C., the optimum temperature with optimum membrane life being about 30° C.

The method is conducted at low or neutral apparent pH. We have found that a pH above about 7 results in the undesirable precipitation of magnesium when relatively high magnesium concentrations are present. The pH of the feed brine is, therefore, maintained at a value of less than about 7 and preferably in the range of about 2 to 6, a value of about 4 being most preferred. Within the preferred range of about 2 to 6, the method proceeds without any precipitation and feed solutions with a Mg content as high as 145 g/L can be processed.

The flow rate of solutions through the concentrate and diluate cells should be such that the linear velocity is sufficient to obtain turbulent flow. The value of the linear velocity is dependent on equipment used. The flows of solutions through the concentrate and diluate cells and the anode and cathode compartments should be substantially balanced in order to maintain a differential pressure across the membranes which is as low as possible to maintain membrane integrity. The differential pressure should not exceed about 100 kPa and is preferably in the range of from 0 to about 100 kPa.

The current applied to the electrodes is controlled such that the membrane current density (applied current per membrane surface area) is such that water splitting is minimized. The current is preferably equivalent to a current density in the range of about 10 to 500 $A/m^2$. Below about 1 $A/m^2$, the ionic transfer rate is too low (the rates approach those of diffusive transport). Above about 500 $A/m^2$ there are not enough lithium ions to replenish the lithium transferred from the diffusion layer at the membrane and, as a result, water splitting occurs to an undesirable extent under severe concentration polarization conditions. The higher values of current density are required for efficient use of the equipment. Water splitting can be substantially obviated when operating with current densities in the range of about 100 to 450 $A/m^2$ under conditions of turbulence in the concentrate and diluate cells. Current densities in this range also provide optimum efficiency and equipment size for the most economical operation.

In one embodiment of the method of the invention, the lithium content in the concentrate is raised only partially in a first electrodialysis step, while simultaneously lowering the magnesium and other multivalent cations content to a relatively low value. The concentrate from the first electrodialysis step is subjected to a treatment with lime in an amount sufficient to precipitate at least a major portion of the magnesium in the concentrate. The excess calcium in the lime reacts with sulfate already present and is removed as gypsum. The so-treated concentrate, after removal of precipitate, is subjected to one or more further electrodialysis steps to raise the concentration of the lithium in the concentrate, while simultaneously removing substantially all remaining magnesium and other multivalent cations with the diluate. This embodiment can be carried out batch-wise, in which case one electrodialysis unit can be used, or continuously using two or more electrodialysis units.

The permselective membranes used in this embodiment are preferably univalent cationic permselective membranes and multivalent anionic permselective membranes. The use of multivalent anionic permselective membranes being advantageous in the removal of any excess calcium that may be present as a result of the lime treatment. In continuous operation, the type of membranes used in the second electrodialysis step can be the same as in batch operation when it is desired to recover lithium as its sulfate. In case of the recovery of lithium as chloride the membranes are monovalent permselective.

The invention will now be illustrated by means of the following non-limitative examples. All tests were carried out at ambient temperatures.

EXAMPLE 1

A number of tests was conducted to determine the permselectivity of cationic membranes. The electrodialysis unit consisted of a rectangular Lucite™ cell partitioned into two compartments by the cationic membrane to be tested. The effective membrane area was 80 $cm^2$. The two compartments were filled with the brine feed and water respectively, and the two liquids were slowly agitated (no turbulence) to promote diffusive transfer (no current was applied). The brine feed to the cell in tests 1, 2 and 3 assayed 7.5 g/L Li, 120 g/L Mg, 1.0 g/L Na and 1.3 g/L K, the feed in test 4 assayed 7.3 g/L Li and 104 g/L Mg and that in test 5 assayed 6.2 g/L Li and 33 g/L Mg. The transfer of Li and Mg to the water side was monitored by assaying samples of the water-containing compartment. The results are tabulated in Table I.

TABLE I

| Test No. | Membrane | Time hours | mg/L Li | mg/l Mg | Apparent Permselectivity $P_{(Li/Mg)}$ |
|---|---|---|---|---|---|
| 1 | Selemion™ CMR | 5 | 66 | 73 | 13.7 |
| | | 24 | 360 | 460 | 12.9 |
| | | 28 | 410 | 600 | 10.9 |
| 2 | Selemion™ Exp'tal A | 6 | 84 | 72 | 17.7 |
| | | 24 | 340 | 270 | 19.8 |
| 3 | Selemion™ Exp'tal B | 6 | 76 | 65 | 17.8 |
| | | 24 | 330 | 255 | 20.4 |
| 4 | Selemion™ CMV | 5 | 86 | 300 | 4.0 |
| | | 24 | 430 | 1100 | 5.6 |
| 5 | Ionac™ MC3470* | 5 | 10 | 23 | 2.3 |
| | | 24 | 34 | 60 | 2.9 |

*Supplied by Sybron Chemical Division

It can be seen that the three membranes tested in tests 1, 2 and 3 displayed an apparent permselectivity ($P_{Li/Mg}$) in the range of 11 to 20, while those tested in tests 4 and 5 had a $P_{Li/Mg}$ which were insufficient to expect efficient Li-Mg separation by electrodialysis. The diffusion transfer rate without the application of current was very low and resulted in inefficient use of equipment.

EXAMPLE 2

This test was carried out in order to increase the diffusion transfer rate with the same feed as in Test No. 1 of Example 1. An electrodialyzer with an effective membrane area of 1548 $cm^2$ was used, with turbulent flow conditions in the cells. No current was applied. The membranes were Selemion™ Experimental A and Selemion™ ASV as the cation and anion permselective membranes, respectively. The diluate and concentrate circulating streams after 7 hours assayed as shown in Table II.

TABLE II

| | g/L Li | g/L Mg |
|---|---|---|
| Diluate | 3.1 | 72 |
| Concentrate | 2.8 | 16 |

As can be seen from the results, the Li ionic flux (transfer rate per area of membrane) was doubled compared to results obtained in Example 1 with the improved cell hydrodynamics. However, the increase in the flux of the more concentrated Mg in the feed was approximately tenfold. The $P_{Li/Mg}$ of 4.1 obtained was satisfactory to achieve a desirable Li-Mg separation in one stage with a Mg:Li weight ratio of 16 in the feed brine.

Example 3

This test shows the effect of applied dc potential. An electrodialysis unit with two diluate and one concentrate compartments, equipped with Selemion™ CMR (cationic) and Selemion TM ASV (anionic) membranes having an effective membrane area of 80cm$^2$, was used. Electrodes were placed in separate compartments. The cathode was made of stainless steel and the anode of platinum. With the exception of the electrode compartments the cell was static (i.e. no through-flow), but the compartments were agitated. A circulating electrode rinse solution was used and controlled at pH 2 by the addition of HCl. A current of 0.5 A was passed for 120 minutes and the ionic flux was monitored by sampling the content of the concentrate cell for Li and Mg assay. Results are shown in Table III.

TABLE III

| Time min. | mg/L Li | Concentrate mg/L Mg | P Li/Mg |
|---|---|---|---|
| 30 | 46 | 83 | 7.6 |
| 120 | 250 | 350 | 10.1 |

It can be seen that the application of the relatively small current of 62.5 A/m$^2$ resulted in an approximately tenfold increase in the ionic flux, compared to results in Example 1. The application of current and the resulting increased ionic flux due to electro transport enabled efficient use of equipment.

EXAMPLE 4

A multi-cell electrodialyzer containing 11 pairs of Selemion TM CMR cationic and Selemion TM ASV anionic membranes was used. The unit has intermembrane distances of 0.75 mm and contained 10 diluate and 9 concentrate cells. The electrodes were positioned in separate electrode compartments. The anode was made of platinum-plate titanium and the cathode of stainless steel.

The initial feed to the diluate cells consists of 10 L brine containing 7 g/L Li and 135 g/L Mg. The diluate was recirculated to the diluate cells. The concentrate stream was circulated to the concentrate cells and consisted initially of 0.8 L 0.05M HCl. The electrode rinse solution was circulated to the electrode compartments and consisted initially of water adjusted with HCl to pH 2.

The circulation flow rates of the concentrate and diluate streams were adjusted to give a linear velocity of 5 cm/sec which was sufficient to ensure turbulent conditions in the cells. The electrode rinse streams were adjusted so that the differential pressure between the concentrate and the rinse streams was 3 kPa.

The electrodialyzer was operated at a current density of 100 A/m$^2$ for 5 hours. The resulting concentrate and diluate streams were analyzed for Li and Mg and the Mg to Li weight ratios were calculated. The results are given in Table IV.

TABLE IV

| Stream | g/L Li | g/L Mg | Mg:Li wt. ratio |
|---|---|---|---|
| Diluate | 5.6 | 132 | 23.6 |
| Concentrate | 16 | 40 | 2.5 |

$P_{Li/Mg}$ was calculated to be 9.4. The results show that a Mg:Li ratio in the concentrate product stream as low as 2.5 can be obtained.

EXAMPLE 5

This example illustrates that dilute feed solutions can be successfully treated. The equipment was the same as for Example 4. A feed brine solution containing 0.07 g/l Li and 1.35 g/l Mg was feed at 18 L/hr, and the diluate stream was recycled at a rate sufficient to maintain a linear velocity of 5 cm/sec in the diluate cells. The concentrate stream was recirculated through the concentrate cells at 5 cm/sec and drawn off at 260 mL/hr. There was no need for fresh input because of water transfer from the diluate stream. The electrodialyzer was operated at a current density of 205 A/m$^2$. The pH in the electrode rinse solution was controlled at a value of 2. The Li and Mg content of the various streams were analyzed and the Mg to Li weight ratios were calculated. The results are shown in Table V as follows:

TABLE V

| Stream | g/L Li | g/L Mg | Mg:Li wt. ratio |
|---|---|---|---|
| Feed | 0.07 | 1.35 | 19.3 |
| Diluate | 0.029 | 0.87 | 30 |
| Concentrate | 2.8 | 33 | 11.8 |

It can be seen that the electrodialysis was effective in concentrating lithium from a dilute feed brine.

EXAMPLE 6

This example illustrates Li recovery versus Li-Mg separation. The equipment employed was as described for example 4. The initial feed brine contained 6.8 g/L Li and 122 g/L Mg. 1500 mL feed brine was circulated through the diluate cells at a linear velocity of 5 cm/sec. The concentrate solution, initially 800 ml of 0.05M HCl, was also circulated at the same linear velocity. The electrodiaylzer was operated at 200 A/m$^2$ and at 300 A/m$^2$. Samples of the concentrate and diluate recirculating streams were taken for Li and Mg analyses at certain time intervals. The pH of these two streams was not controlled, but the electrode rinse stream was maintained at pH 2.

The results obtained at 200 A/m$^2$ are shwon in Table VI.

TABLE VI

| Time (min) | Li Recovery* % | Diluate Stream g/L Li | g/L Mg | Mg:Li | Concentrate Stream g/L Li | g/L Mg | Mg:Li |
|---|---|---|---|---|---|---|---|
| 0 | 0 | 6.8 | 122 | 17.9 | 0 | 0 | — |
| 60 | 32 | 4.3 | 90 | 20.9 | 2.7 | 10.0 | 3.7 |
| 120 | 53 | 3.3 | 70 | 21.2 | 5.0 | 16.0 | 3.2 |
| 180 | 64 | 2.5 | 60 | 24. | 7.0 | 30.0 | 4.3 |
| 300 | 74 | 1.8 | 60 | 33.3 | 8.5 | 38.0 | 4.5 |
| 360 | 79 | 1.5 | 56 | 37.3 | 8.7 | 40.0 | 4.6 |

*Calculated on the feed solution

The results obtained at 300 A/m$^2$ are shown in Table VII.

TABLE VII

| Li Recovery % | Diluate Stream Mg:Li weight ratio | Concentrate Stream Mg:Li weight ratio |
|---|---|---|
| 25 | 24 | 3 |
| 50 | 26 | 6 |
| 80 | 54 | 12 |

It can be seen from the results tabulated in Tables VI and VII that the Mg:Li weight ratio in the concentrate stream increased with the extent of Li removal from the original brine feed. The results in Table VI show a satisfactorily low ratio of less than 5 could be obtained at a current density of 200 A/m$^2$ in a single stage with a 79% recovery of lithium. The results in Table VII, however, show that at the higher current density of 300

$A/m^2$, the Li recovery must be restricted to less than 50% in order to obtain the desired low Mg:Li weight ratio in the concentrate. It follows that, in order to obtain the desired low ratio as well as a high recovery, the electrodialysis must be carried out in more than one step.

EXAMPLE 7

This example illustrates that diluate from a first stage electrodialysis can be subjected to further electrodialysis to give increased Li recovery with substantial separation from Mg. The equipment employed was as described for Example 4. A first stage electrodialysis with a feed brine containing 7 g/L Li and 135 g/L Mg was carried out at 290 $A/m^2$. 45% of the lithium was recovered in a concentrate with a Mg:Li weight ratio of 3.3:1 g/L Li and 105 g/L Mg, circulating diluate stream of a second stage electrodialysis carried out at 290 $A/m^2$. The circulating concentrate stream in this second stage was initially 700 mL of 0.05M HCl, but slowly gained volume as a result of the net water transfer from the diluate, reaching a total volume of 950 mL after 5 hours. The Li and Mg contents of the diluate and concentrate from the second stage electrodialysis were determined after 2.5 and 5 hours and analyses and calculated Mg:Li weight ratios are shown in Table VIII.

TABLE VIII

| Stream | Time (h) | g/L Li | g/L Mg | Mg:Li wt ratio |
|---|---|---|---|---|
| Feed: | 2.5 | 4.0 | 105 | 26.3 |
| Diluate: | 2.5 | 3.0 | 96 | 32 |
| Concentrate: | 2.5 | 7.0 | 40 | 5.7 |
| Feed: | 5.0 | 4.0 | 105 | 26.3 |
| Diluate: | 5.0 | 3.0 | 100 | 33.3 |
| Concentrate: | 5.0 | 9.5 | 54 | 5.7 |

In the second electrodialysis stage, 28% of the input Li was recovered giving a concentrate with a Mg:Li weight ratio of 5.7. Thus, by employing two electrodialysis stages a concentrate stream with the desired Mg:Li weight ratio was produced in the first stage and the lithium recovery was improved in the second stage.

EXAMPLE 8

This example illustrates that by using a non-chloride solution for the anode rinse solution, chlorine evolution can be minimized. A 0.25 Molar $Na_2SO_4$ solution, adjusted to pH 2 by the addition of sulphuric acid, was used as electrode rinse solution. In the electrodialyzer operated at 6 A (345 $A/m^2$), 2 L of the rinse solution was circulated through both the anode and cathode compartments. The pH was maintained at 2 by sulphuric acid addition. Chlorine evolution from the electrodialysis was monitored by measuring chlorine levels in the air in the immediate vicinity of the unit. The results obtained are compared to the case of using dilute hydrochloric acid having a pH of 2 for electrode rinse solution. The results are given in Table IX.

TABLE IX

| | Chlorine levels in the air | |
|---|---|---|
| Time, min. | dilute HCl (pH 2) | 0.25 M $Na_2SO_4$ |
| 5 | 0.5 ppm | not detectable |
| 10 | 1.0 ppm | not detectable |
| 30 | 1.5 ppm | trace |
| 60 | 2 ppm | 0.5 ppm |
| 120 | 8 ppm | 1 ppm |

As can be seen from the results for an operation at 6 A, the 0.25M $Na_2SO_4$ electrode rinse solution gave much lower chlorine levels in the air than a hydrochloric acid rinse solution. It was further determined that replacement of 20 ml/min of the sulfate solution with fresh solution allowed the chloride concentration in the rinse solution to be maintained at 3 g/L or less throughout the operation.

EXAMPLE 9

This example illustrates the deportment of other brine constituents. The electrodialyzer and membranes employed were as described in Example 4. The brine feed contained 7 g/L Li, 130 g/L Mg, 3 g/L Na, 2.6 g/L K, 6.3 g/L B and 42 g/L $SO_4$ with chloride as the predominant anion. 3 L of the brine feed was circulated through the electrodialyzer at a linear velocity of 5 cm/sec. The concentrate stream (0.9 L, initially 0.05M HCl) was also circulated at the same rate. Electrode rinse solution, initially contained 0.25M $Na_2SO_4$, was fed at 20 mL/min and circulated at a sufficient rate to obtain approximately zero differential pressure between the rinse and the other streams. The electrodialyzer was operated at a current density of 260 $A/m^2$. After 5 hours the various streams were analyzed and the results are given in Table X.

TABLE X

| Element | Diluate Stream Concentration in g/L | Concentrate Stream Concentration in g/L |
|---|---|---|
| Li | 2.3 | 15.0 |
| Mg | 93. | 50.0 |
| Na | 0.39 | 6.5 |
| K | 0.2 | 4.0 |
| B | 5.8 | 1.9 |
| $SO_4$ | 41.6 | 0.45 |

It can be seen from the results that Na and K reported substantially with Li in the concentrate stream. The value of $P_{Li/Mg}$ was 12.1 compared with a value for $P_{Li/Na}$ of 0.4 and a value of P Li/K of 0.3. It follows that the apparent ease of transport (i.e. to the concentrate stream) was in the order K>Na>Li>>Mg. Only 0.3% of the $SO_4$ and less than 10% of the boron in the feed brine reported to the concentrate stream.

EXAMPLE 10

This example illustrates that Li can be recovered in a highly concentrated solution, substantially free of multivalent cations, particularly Mg and Ca, by multi-step electrodialysis and removal of Mg by treatment with lime. A brine containing 7 g/L Li and 135 g/L Mg was fed to a first electrodialysis, using the unit as used in Example 4, carried out at 200 $A/m^2$. The concentrate, which contained 9 g/L Li and 42 g/L Mg (Mg:Li weight ratio 4.67), was treated with a 20% calcium hydroxide solution until the pH reached a value of 11. Calcium remaining in solution was precipitated by adding sulfuric acid. The precipitate of magnesium hydroxide and gypsum was removed by filtration. Calcium remaining in solution was precipitated with sulfuric acid and precipitate removed. The filtrate, which contained 6.5 g/L Li, 0.0009 g/L Mg and 0.04 g/L Ca, was adjusted with hydrochloric acid to a pH of 4. The adjusted filtrate was fed to the diluate cells for a second electrodialysis. The second electrodialysis was carried out for 2 hours at 405 $A/m^2$ and yielded a diluate containing 0.05 g/L Li, 0.0007 g/L Mg and 0.03 g/L Ca, and a concentrate containing 15.5 g/L Li, 0.0014 g/L Mg and 0.008 g/L Ca. The Li recovery in the concentrate of the first electrodialysis was 83% and of the second 95% for an overall recovery of 78.9% of the Li from the original brine. During each electrodialysis step, diluate and concentrate solutions were circulated to the diluate and concentrate cells, respectively. The electrode compartments were rinsed with a 0.25M $Na_2SO_4$ solution adjusted to $pH_2$. Flow rates were such that turbulent conditions were maintained.

What we claim as new and desire to protect by Letters Patent of the United States is:

1. A method for the recovery of lithium from brines containing monovalent cations including lithium, multivalent cations including magnesium and monovalent and multivalent anions which method comprises the steps of subjecting brine to electrodialysis; feeding brine to diluate cells of an electrodialysis unit comprising a multiplicity of alternating monopolar cationic permselective membranes and monopolar anionic permselective membranes, said membranes defining alternating diluate and concentrate cells, an anode compartment and a cathode compartment, an anode positioned in the anode compartment and a cathode positioned in the cathode compartment; applying an electrical current between the anode and the cathode at a value such that the value of the corresponding current density is in the range of about 10 to 500 A/m$^2$; maintaining the temperature in the unit in the range of about 0° to 60° C.; maintaining the pH of the brine fed to the electrodialysis at a value of less than about 7; passing flows of solutions through the diluate and concentrate cells at a linear velocity sufficient to maintain turbulent flow in said cells; removing a lithium-depleted diluate from the diluate cells; withdrawing a lithium-enriched concentrate from the concentrate cells, said concentrate containing magnesium and lithium in a weight ratio of about 5:1 or less; and recovering lithium from withdrawn concentrate.

2. A method as claimed in claim 1, wherein said membranes have a membrane matrix of a styrene di-vinyl benzene copolymer and have active groups in an amount in the range of about 3 to 4 milli-equivalents per gram of dry resin, the active groups of the cationic membranes being sulphonic acid radicals and the active groups of the anionic membranes being a derivative of trimethylamine.

3. A method as claimed in claim 1, wherein the current density is in the range of about 100 to 450 A/m$^2$.

4. A method as claimed in claim 1, wherein the pH of solutions passing through the diluate and concentrate cells is in the range of about 2 to 6.

5. A method as claimed in claim 1, wherein the temperature in the electrodialysis is maintained in the range of about 5° to 50° C.

6. A method as claimed in claim 1, wherein the flows of solutions passing through the diluate and concentrate cells are substantially balanced and the differential pressure across the membranes does not exceed about 100 kPa.

7. A method as claimed in claim 1, wherein brine fed to diluate cells contains magnesium and lithium in a weight ratio in the range of about 1:1 to 60:1.

8. A method as claimed in claim 1, wherein brine fed to diluate cells contains lithium in the range of about 0.03 to 15 g/L.

9. A method as claimed in claim 2, wherein brine fed to diluate cells contains lithium in the range of about 0.03 to 15 g/L.

10. A method as claimed in claim 1, wherein at least a portion of the diluate removed from the diluate cells is recycled to the diluate cells.

11. A method as claimed in claim 1, wherein at least a portion of the concentrate withdrawn from concentrate cells is recycled to the concentrate cells.

12. A method as claimed in claim 1, wherein a quantity of a receiving solution of an acidic substance is fed to the concentrate cells when the net water transfer rate to the concentrate cell in the electrodialysis is less than the withdrawal rate of concentrate from the concentrate cells, said acidic substance being chosen from hydrochloric acid, sulfuric acid, sodium sulfate and sodium bisulfate.

13. A method as claimed in claim 1, wherein the anode compartment and the cathode compartment are rinsed with a circulating rinse solution having a pH of about 2.

14. A method as claimed in claim 1, wherein the anode compartment and the cathode compartment are rinsed with a rinse solution containing chloride ions in concentration of less than about 3 g/L and having a pH maintained at a value of about 2.

15. A method as claimed in claim 1, wherein the anode compartment and the cathode compartment are rinsed with a rinse solution containing sodium sulfate in a concentration in the range of 0.1 to 1.0 molar and the pH of the rinse solution is maintained at a value of about 2 with sulfuric acid.

16. A method as claimed in claim 1, wherein brine is at least partially evaporated prior to feeding to the electrodialysis unit to reduce the concentration of monovalent cations other than lithium.

17. A method as claimed in claim 1, wherein concentrate withdrawn from said concentrate cells and prior to said recovering of lithium therefrom is subjected to at least one more electrodialysis, whereby the separation of lithium from multivalent cations is improved.

18. A method as claimed in claim 1, wherein diluate withdrawn from said diluate cells is subjected to at least one more electrodialysis, whereby the recovery of lithium is improved.

19. A method as claimed in claim 1, wherein brine is subjected to a first electrodialysis whereby the brine is partially concentrated to raise the concentration of lithium and to simultaneously lower the concentration of magnesium in a concentrate, withdrawing said concentrate, subjecting withdrawn concentrate to a treatment with lime in an amount sufficient to precipitate at least a major portion of the magnesium, removing precipitated magnesium to give a treated concentrate and subjecting treated concentrate to at least one more electrodialysis to further raise the concentration of lithium and to remove substantially all remaining magnesium; and recovering a concentrate substantially free of multivalent cations.

20. A method for the recovery of lithium from brines containing monovalent cations including lithium in an amount in the range of about 0.03 to 15 g/L lithium, multivalent cations including magnesium and anions which method comprises the steps of subjecting brine containing magnesium and lithium in a weight ratio in the range of 1:1 to 60:1 to at least one step of electrodialysis; feeding brine to diluate cells of an electrodialysis unit, said unit comprising a multiplicity of alternating cationic permselective membranes and anionic permselective membranes, wherein said membranes have a membrane matrix of a styrene di-vinyl benzene copolymer and have active groups in an amount in the range of about 3 to 4 milli-equivalents per gram of dry resin, the active groups of the cationic membranes being sulphonic acid radicals and the active groups of the anionic membranes being a derivative of trimethylamine, said membranes defining alternating diluate and concentrate cells, an anode compartment containing a suitable anode and a cathode compartment containing a suitable cathode; applying an electrical current between the anode and the cathode at a value such that the value of the corresponding current density is in the range of about 100 to 450 A/m$^2$; removing a diluate from the diluate cells; withdrawing lithium-enriched concentrate from the concentrate cells; maintaining the temperature in the electrodialysis in the range of about 5° to 50° C., maintaining the pH of the brine fed to the electrodialysis at a value in the range of about 2 to 6; passing flows of solutions through the diluate and concentrate cells at a linear velocity sufficient for maintaining turbulent flow in said cells, said flows being substantially balanced and the differential pressure across the membranes being less than about 100 kPa; recycling at least a portion of the diluate removed from the diluate cells to the diluate cells; recycling at least a portion of the concentrate withdrawn from concentrate cells to the concentrate cells; rinsing the anode compartment and the cathode compartment with a rinse solution containing chloride ions in a concentration of less than about 3 g/L; maintaining the pH of the rinse solution at a value of about 2; withdrawing a final concentrate from the electrodialysis which contains magnesium and lithium in a weight ratio not higher than about 5:1; and recovering lithium from said final concentrate.

21. A method as claimed in claim 20, wherein the electrodialysis is carried out in more than one step and concentrate is subjected to at least one more electrodialysis, whereby the separation of lithium from multivalent cations is improved.

22. A method as claimed in claim 20, wherein the electrodialysis is carried out in more than one step and diluate is subjected to at least one more electrodialysis, whereby the recovery of lithium is improved.

23. A method as claimed in claim 20, wherein concentrate from a first electrodialysis is subjected to a treatment with lime in an amount sufficient to precipitate at least a portion of the magnesium prior to subjecting concentrate to any further electrodialysis.

24. A method claimed in claim 21, wherein concentrate from a first electrodialysis is subjected to a treatment with lime in an amount sufficient to percipitate at least a portion of the magnesium prior to subjecting concentrate to any further electrodialysis.

25. A method as claimed in claim 20, wherein a quantity of a receiving solution of an acidic substance is fed to the concentrate cells when the net water transfer rate to the concentrate cell in the electrodialysis is less than the withdrawal rate of concentrate from the concentrate cells, said acidic substance being chosen from hydrochloric acid, sulfuric acid, sodium sulfate and sodium bisulfate.

26. A method as claimed in claim 20, wherein the anode compartment and the cathode compartment are rinsed with a rinse solution containing sodium sulfate in a concentration in the range of 0.1 to 1.0 molar and the pH of the rinse solution is maintained at a value of about 2 with sulfuric acid.

27. A method as claimed in claim 20, wherein brine is at least partially evaporated prior to feeding to the electrodialysis unit to reduce the concentration of monovalent cations other than lithium.

* * * * *